United States Patent
Zhang et al.

(10) Patent No.: US 9,712,047 B2
(45) Date of Patent: Jul. 18, 2017

(54) POWER FACTOR CONTROLLER WITH ERROR FEEDBACK, AND A METHOD OF OPERATING SUCH A POWER FACTOR CONTROLLER

(75) Inventors: Cheng Zhang, Nijmegen (NL); Frans Pansier, Nuenen (NL); Peter Theodorus Johannes Degen, Arnhem (NL)

(73) Assignee: NXP B.V., Eindhoven (NL)

( * ) Notice: Subject to any disclaimer, the term of this patent is extended or adjusted under 35 U.S.C. 154(b) by 339 days.

(21) Appl. No.: 13/284,573

(22) Filed: Oct. 28, 2011

(65) Prior Publication Data

US 2012/0112711 A1    May 10, 2012

(30) Foreign Application Priority Data

Nov. 8, 2010 (EP) .................... 10190320

(51) Int. Cl.
G05F 1/00 (2006.01)
H02M 1/42 (2007.01)

(52) U.S. Cl.
CPC ......... H02M 1/4225 (2013.01); Y02B 70/126 (2013.01); Y02P 80/112 (2015.11)

(58) Field of Classification Search
CPC ...... H02M 7/066; H02M 1/42; H02M 1/4208; H02M 1/425; H02M 1/4258; G01R 29/0871; H02J 5/005; Y02B 70/12
USPC ....... 323/205, 207, 222, 246, 271, 282, 284, 323/285, 286, 351, 283; 327/336
See application file for complete search history.

(56) References Cited

U.S. PATENT DOCUMENTS

| | | | | |
|---|---|---|---|---|
| 4,109,308 | A | * | 8/1978 | Rodel ........................... 363/125 |
| 4,706,012 | A | * | 11/1987 | Kerkman et al. ............. 323/280 |
| 5,619,405 | A | | 4/1997 | Kammiller et al. |
| 6,510,068 | B1 | * | 1/2003 | Bors ............................. 363/163 |
| 6,621,257 | B2 | * | 9/2003 | Mitamura et al. ............. 323/282 |
| 6,756,771 | B1 | * | 6/2004 | Ball et al. ...................... 323/284 |
| 7,719,246 | B2 | * | 5/2010 | Melanson .................... 323/282 |
| RE43,291 | E | * | 4/2012 | Groom ........................ 323/282 |
| 8,345,456 | B2 | | 1/2013 | Nishikawa |
| 8,525,493 | B2 | | 9/2013 | Saint-Pierre |
| 2005/0007083 | A1 | * | 1/2005 | Yang et al. ................... 323/282 |

(Continued)

FOREIGN PATENT DOCUMENTS

| | | |
|---|---|---|
| CN | 1917341 | 2/2007 |
| CN | 101741234 | 6/2010 |

(Continued)

OTHER PUBLICATIONS

Extended European Search Report dated Jun. 8, 2011 issued in EP 10190320.1.

(Continued)

*Primary Examiner* — Alex Torres-Rivera

(57) ABSTRACT

A power factor controller is disclosed, in which error feedback is provided my means of a parallel combination of at least two error feedback channels. By providing at least two error feedback channels, the stability associated with, for instance, a continuously integrated feedback loop with relatively long time constant, may be combined with a fast transient response associated with, for instance, a sample-and-hold error feedback.

A method of operating such a power factor controller is also disclosed.

18 Claims, 5 Drawing Sheets

(56) References Cited

U.S. PATENT DOCUMENTS

| | | | | |
|---|---|---|---|---|
| 2007/0275684 A1* | 11/2007 | Harada et al. | ............. | 455/185.1 |
| 2008/0067993 A1* | 3/2008 | Coleman | ................. | H02M 1/08 |
| | | | | 323/282 |
| 2010/0308889 A1* | 12/2010 | Lee et al. | ...................... | 327/336 |
| 2012/0155140 A1* | 6/2012 | Chen | ................... | H02M 7/5387 |
| | | | | 363/132 |

FOREIGN PATENT DOCUMENTS

| | | |
|---|---|---|
| CN | 101741244 | 6/2010 |
| CN | 101789684 | 7/2010 |
| EP | 0580237 A | 1/1994 |
| WO | 2006072917 A | 7/2006 |

OTHER PUBLICATIONS

TEA 1750 GreenChip III SMPS control IC, Rev. 02-15 Dec. 2008 Product data sheet. NXP B.V. 2008.
TEA1742T GreenChip PFC Controller. Rev. 01-10 Feb. 2009. Objective data sheet. NXP B.V. 2009.

* cited by examiner

POWER FACTOR CONTROLLER WITH ERROR FEEDBACK, AND A METHOD OF OPERATING SUCH A POWER FACTOR CONTROLLER

FIELD OF THE INVENTION

This invention relates to power factor controllers (PFCs) with error feedback, and to methods of operating such power factor controllers.

BACKGROUND OF THE INVENTION

PFCs are increasingly widely used in power management, for applications ranging from PCs, to adapters and lighting. In order to achieve control of the output voltage, conventionally an error amplifier is used. As will be described in the more detail hereinbelow, the error between the actual output DC voltage and the nominal required DC voltage is amplified and integrated, and the resulting signal is used to adjust the switch-on time of the power switch in the power factor controller. The integration time constant is typically large, in order to avoid instability in the system.

Such a conventional error feedback mechanism can provide an accurate steady-state value of the output voltage. However, the long integration time constant results in a slow response to transient variation of the load current, which slow transient response is not ideal.

European patent application publication EP-A-0,580,237 discloses a power factor correction circuit, with an improved error feedback circuit, in which a sampling-and-hold circuit is series-connected to a conventional error amplifier, in order to improve the transient response. However, for accurate DC output voltage, it is necessary that the sampling occurs at an instant within the mains half-cycle at which the PFC output voltage is equal to the DC value in steady-state; that is to say either during a zero-crossing of the mains or at the mains peak voltage. Thus, this error feedback system is inflexible, in particular since it requires precise detection of the phase of the mains voltage.

SUMMARY OF THE INVENTION

According to the present invention there is provided a power factor controller comprising an error feed-back circuit for controlling an output of the power factor controller, wherein the error feedback circuit comprises a parallel arrangement of at least first error feedback channel and a second error feedback channel. The power factor controller is of particular interest in the field of power management systems, such as switched mode power converters or switched mode power supplies. Moreover the power factor controller may be coincident with other functionality—such as, would be the case in, for instance, a flyback converter with mains isolation, since such a converter is also providing a power factor controller function. Thus (a part of) any power converter which includes power factor control functionality is encompassed by the term "power factor controller".

In embodiments, the first error feedback channel comprises an integrator configured to integrate a difference between a signal indicative of an output of the power factor controller and a reference signal. The integrator may be configured to be a continuous-time integrator. Thus, the error-feedback circuit may benefit from continuous integration which may be integrated with steady-state high gain to ensure good accuracy.

In embodiments, the second error feedback channel comprises an integrator configured to periodically integrate a difference between a signal indicative of an output of the power factor controller and a reference signal over a predetermined time interval. In embodiments, the power factor controller is adapted for operation with a mains supply and the periodic integration has a periodicity associated with that of a mains half-cycle. The association may be equality with, or a multiple or fraction of the mains half-cycle.

In embodiments, the first error feedback channel is arranged to be sampled to provide a sample, and the sample provided to the second error feedback channel to determine an initial value for the integration of a difference between a signal indicative of an output of the power factor controller and a reference signal.

In other embodiments, the second error feedback channel comprises a sample-and-hold circuit configured to periodically sample a difference or a scaled difference between a signal indicative of an output of the power factor controller and a reference signal at a predetermined moment. In embodiments, the power factor controller is adapted for operation with a mains supply and the periodic sampling has a periodicity associated with that of a mains half-cycle. The association may be equality with, or a multiple or fraction of the mains half-cycle.

In embodiments an output of the error feed-back circuit comprises the sum of an output of the first error feedback channel and an output of the second error feedback circuit. Alternatively, the sum may include a scaled version of the respective output of at least one of the first and second error feedback channels.

In embodiments, the output of at least one of the first and second error feedback circuits includes an offset signal for adjusting a range of at least one of said outputs.

According to another aspect of the invention, there is provided a switched mode power converter comprising a power factor controller as described above.

According to further aspect of the invention, there is provided a method of providing an error feed-back signal in a power factor controller operating in voltage control mode, the method comprising providing a first channel error feedback signal by continuously integrating a difference between a signal indicative of an output of the power factor control and a reference signal, providing a second channel error feedback signal, and determining an error feedback signal from the first channel error feedback signal and the second channel error feedback signal.

In embodiments, providing a second channel error feedback signal comprises periodically sampling a difference between a signal indicative of an output of the power factor control and a reference signal at a predetermined moment.

In other embodiments, wherein providing a second channel error feedback signal comprises periodically integrating a difference between a signal indicative of an output of the power factor control and a reference signal over a predetermined time interval.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
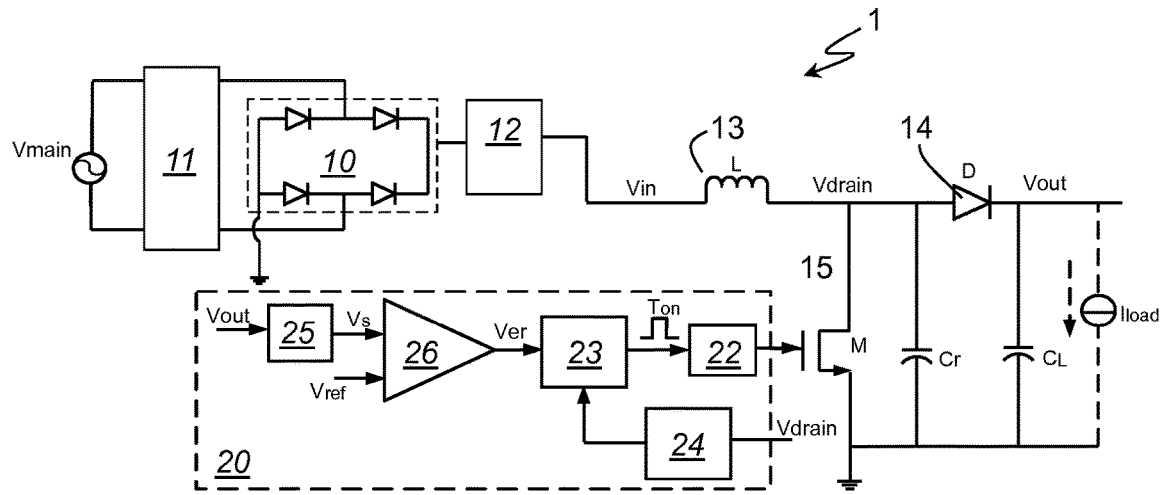
FIG. 1 is a block diagram of a power factor controller arranged for operation in boundary conduction mode and having a conventional error feedback circuit.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

A block diagram of a power factor controller 1 arranged for operation in boundary conduction mode (BCM) and having a conventional error feedback circuit is shown in FIG. 1. The PFC 1 has a bridge rectifier 10, with EMI filters 11 and 12 before and after the bridge rectifier 10 respectively. The bridge rectifier supplies a boost converter comprising coil L shown at 13, diode D at 14 and power switch M at 15 and capacitor CL, to provide an output voltage Vout, which powers a load which as shown draws a load current Iload. A capacitor Cr combined with coil L results in a well-defined ringing frequency of the drain voltage of power switch during the self-oscillation period in each conversion cycle to facilitate the valley-switching.

Switch 15 is controlled by control circuitry 20. Control circuitry 20 comprises a switch driver 22, the timing of which is controlled by $T_{on}$ control 23, together with valley detection unit 24, which valley detection unit 24 has an input related to the drain voltage Vdrain. The $T_{on}$ controller 23 takes as input an error voltage Ver. Error voltage Ver is derived from a /K scaled version Vs, that is to say Vout/K, of the output voltage Vout by an error amplifier which amplifies the difference between Vs and a reference voltage Vref.

Figure 2:
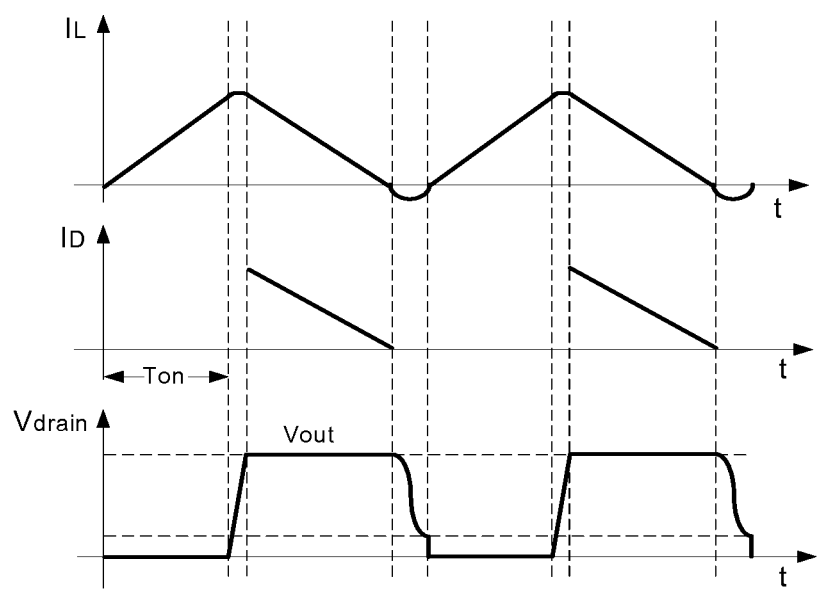
FIG. 2 shows a timing diagram of a power factor controller operating in boundary conduction mode.

A timing diagram of the circuit in FIG. 1 is shown in FIG. 2. The figure shows, from the top, the inductor current $I_L$ (also called coil current) through inductor 13, the diode current $I_D$ through diode 14, and the voltage Vdrain across the switch 15. During each conversion cycle, switch 15 is turned on for a time $t_{on}$, during which Vdrain is low, and the inductor current $I_L$ rises from zero to a peak value. At the end of $t_{on}$, switch 15 is turned off, the drain voltage Vdrain goes high—approximately to Vout—and the inductor current $I_L$ decreases and falls back to zero. When the coil current falls to zero, Vdrain starts to oscillate, with a period based on the coil inductance and the capacitance at the drain of switch 15. When the drain voltage achieves its minimum value of the oscillation, switch 15 is turned on again to restart the next conversion cycle, according to well-known "valley switching" principles.

The output voltage of the PFC (Vout) is sensed by the control circuitry 20 that controls the switch on-time ($t_{on}$)— that is to say, the time for which the switch is closed—of the power switch 15, in each conversion cycle so that Vout always achieves the desired value, irrespective of the load current Iload. Once the output voltage Vout is stabilised, $t_{on}$ will be constant for a fixed load current. In control circuitry 20, Vout is first divided by a factor K which is greater than unity (i.e. K>1) at block 25, and the resulting signal Vs is compared with a reference voltage Vref, the difference being processed by an error amplifier 26 whose output voltage Ver is used to adjust the on-time $t_{on}$. The output of the $t_{on}$ controller 23, which is typically a square wave, is used to drive the switch driver 22, to control the timing of the switch-on and switch-off moments of switch 15. A signal related to the drain voltage Vdrain is sensed by the valley detection circuit which outputs an impulse to the $t_{on}$ control block 23, wherein the valley is sensed out such that the $t_{on}$ control block 23 drives the driver again to start the next conversion cycle.

Figure 3:
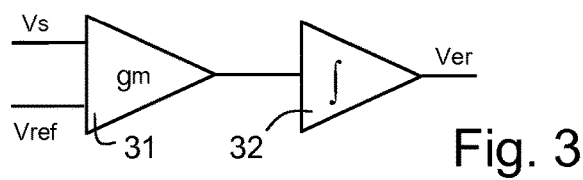
FIG. 3 is a block diagram of a conventional error amplifier used in power factor controllers.

A block diagram of a conventional error amplifier used in power factor controllers, such as is conventionally used in control circuitry 20, is shown in FIG. 3. The error amplifier comprises transconductance amplifier 31 having a transconductance gm, and a first input Vs being the factor-K scaled version of Vout, and a second input Vref being a reference voltage. The output of transconductance amplifier 31 is provided to integrator 32, the output of which provides the error voltage Ver.

Figure 4:
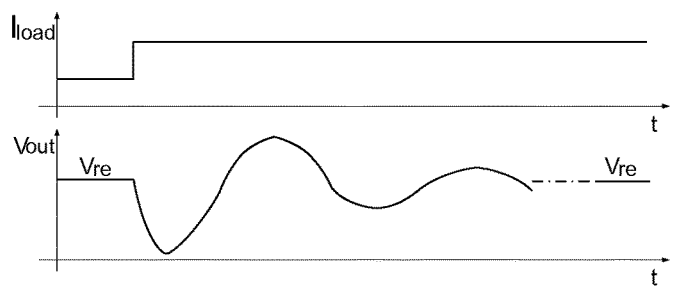
FIG. 4 is a timing diagram illustrating the response to a load step in a PFC with conventional error amplifier.

At least one of transconductance amplifier 31 and integrator 32 is chosen to have a high voltage gain, in order that the PFC output voltage achieves an accurate DC steady-state value Vre, determined by Vref and the factor K. Thus, the PFC regulates its output voltage Vout to achieve the required steady-state value Vre. However, due to the large integration time constant, the error amplifier will result in a slow transient response in response to variation of the load current. FIG. 4 is a timing diagram illustrating the response to such a load step in a PFC with a conventional error amplifier. The figure shows a step in load current Iload, in the upper graph and the variation in the output voltage Vout which ensues, in the low graph. It is apparent that Vout is relatively lightly damped, and does not settle to its original value Vre until several mains cycles have passed. If one were to lower the integration time constant in order to increase the damping and reduce the settling time, the whole PFC system would tend to become unstable. To restabilise the system it would be necessary to lower the voltage gain of the error amplifier; however, this will make DC voltage at the PFC output less accurate.

Figure 5:
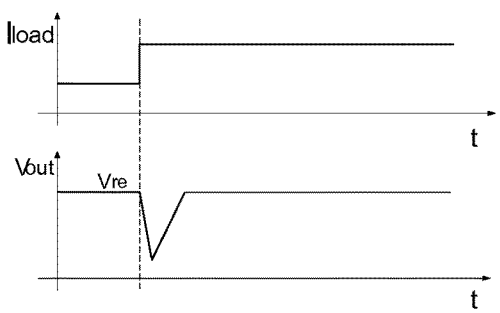
FIG. 5 is a timing diagram illustrating the response to a load step in a PFC with error feedback according to embodiments of the invention.

An improved response to steps in the load current is shown in FIG. 5. Again, a step in load current (Iload) is shown; however in this case, the transient in the output voltage Vout is a significantly shorter. In order to achieve to such an improved transient response, whilst concurrently retaining steady-state accuracy, there is provided an error amplifier with multichannel error feedback. In other words, the scaled PFC output voltage is measured by two or more error feedback channels and connected in parallel. Typically, in one channel, the difference between the scaled PFC output voltage Vs and the reference voltage Vref is continuously integrated with a large integration time constant. In a second channel, the difference between the scaled PFC output voltage Vs and the reference voltage Vref may, for instance, be integrated over a discrete relatively short time interval. Alternatively and without limitation, in the second channel, a sampling-and-hold circuit may be used to sample the difference or a scaled difference between the scaled PFC output voltage Vref and the reference voltage Vref at a particular moment in time. The outputs of both channels are processed and generate the signal Ver which is used to control the current delivered to the load. As a result of integrating over a short discrete interval or sampling at a particular moment, Vout will settle to the required value very quickly, and due to the feedback of the continuously integrated error signal with a high gain, accurate steady-state value is also insured, thereby achieving the fast response curve as shown in FIG. 5.

Figure 6:
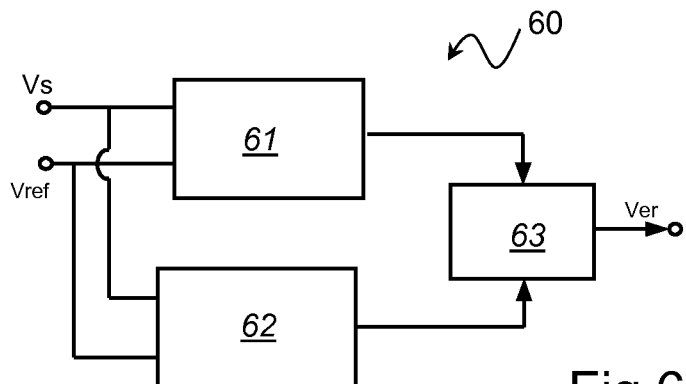
FIG. 6 shows a block diagram illustrating a first embodiment of the invention.

FIG. 6 shows a block diagram illustrating a first embodiment of the invention. The diagram shows a multichannel error amplifier 60. The multichannel error amplifier comprises a continuous time integration channel provided by a continuous time integrator 61, and a discrete time integration channel provided by a discrete a time integrator 62. Both the continuous time to integrator 61 and the discrete a time integrator 62 have as inputs the scaled voltage signal Vs and the reference voltage Vref. The output of each of the continuous time integrator and the discrete time integrator is provided to a signal processing unit 63. The signal processing unit combines the outputs, and may further process the signal to achieve an output Ver, which is passed as an input to the $t_{on}$ control unit 23 illustrated in FIG. 1 (instead of Ver). The multichannel error amplifier 60 thus takes the place of the (single channel) error amplifier 26 of FIG. 1.

Figure 7:
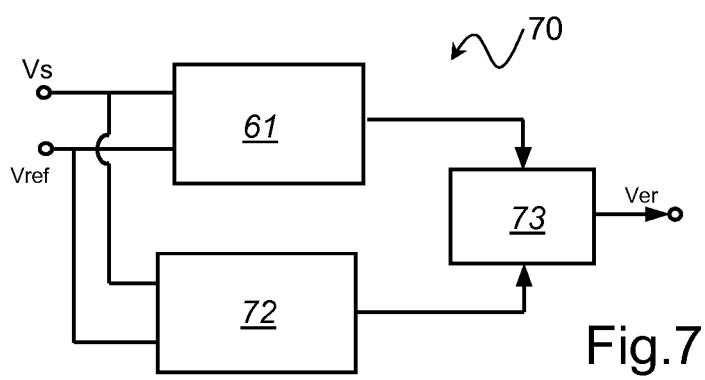
FIG. 7 shows a block diagram illustrating a second embodiment of the invention.

FIG. 7 shows a block diagram illustrating a second embodiment of the invention. This diagram shows a multichannel error amplifier 70. The multichannel error amplifier comprises a continuous time integration channel provided by a continuous time integrator 61 and a sampling and hold channel provided by a sampling and hold unit 72. Both the continuous time integrator 61 and the sampling and hold unit 72 have as inputs the scaled voltage signal Vs and the reference voltage Vref. The output of each of the continuous time integrator and the sampling and hold unit is provided to a signal processing unit 73. The signal processing unit 73 combines the outputs, and may further process the signal to achieve an output Ver, which is passed as an input to the $t_{on}$ control unit 23 illustrated in FIG. 1.

Figure 8:
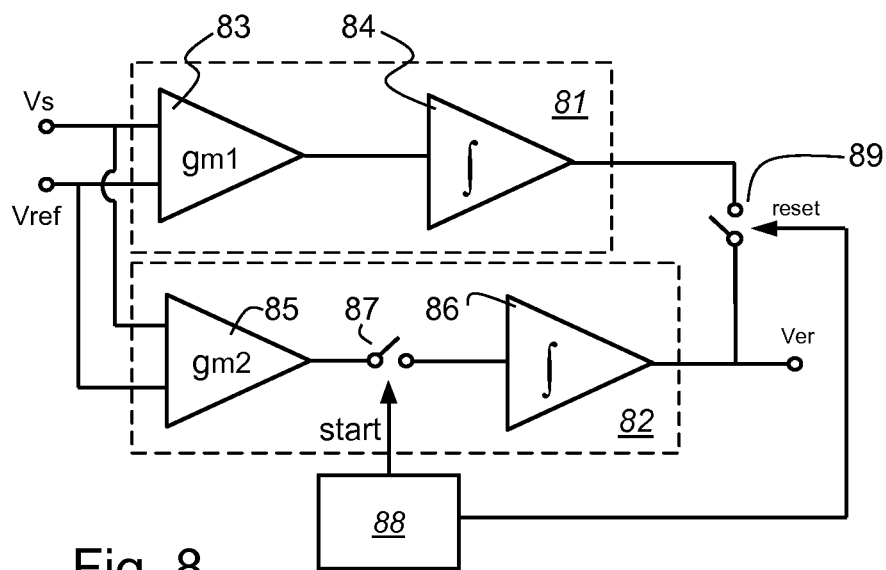
FIG. 8 shows a block diagram of an error amplifier according to an embodiment of the invention.

FIG. 8 shows a block diagram of an error amplifier according to the first embodiment of the invention, has just described with reference to FIG. 6. As shown in FIG. 8, the continuous time integration channel 81 comprises a series arrangement of a first transconductance amplifier gm1 at 83 and a first integrator at 84. The discrete time integration channel 82 comprises a series arrangement of a second transconductance amplifier gm2 at 85 and a second integrator 86. However, series connection between of the second transconductance amplifier 85 and the second integrator 86 is switchable by means of switch 87. The turn-on moment of the switch 87 is controlled by means of timer 88.

Figure 9:
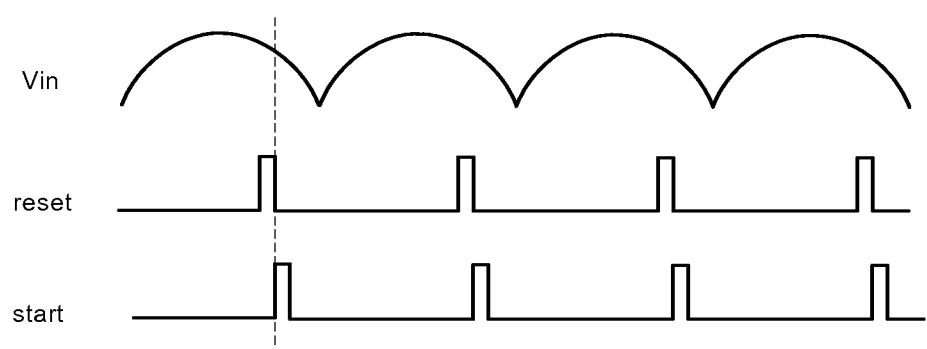
FIG. 9 shows a timing diagram of a timer for an error amplifier according to FIG. 8.

The operation of the circuit shown in block form in FIG. 8 is as follows: in the continuous time integration channel 81, the voltage difference (Vs-Vref) is converted to the voltage controlled current by the transconductance amplifier 83, and the current is continuously integrated by the integrator 84. In the discrete time integration channel 82, the voltage difference (Vs-Vref) is also converted to a voltage controlled current by the transconductance amplifier 85, but the current is only integrated during a periodic short pulse, labelled as "start" in the figure, during which time the switch 87 is closed under the control of timer 88. The outputs from the two channels are connected together during a further periodic short pulse labelled as "reset" in the figure by means of a second switch 89, which is also under the control of timer 88. An exemplary timing diagram of the timer 88 is illustrated on the FIG. 9, wherein it is shown that the short pulses have the same frequency as Vin, and the short pulse "start" follows immediately after the short pulse "reset". In other embodiments, the short time pulses may have another frequency which does not match Vin. Both "start" and "reset" pulse may have a duration which is of the order of 10 µs, whilst the cycle time of the signal Vin, being half a mains period, would be typically be about 10 ms.

Figure 10:
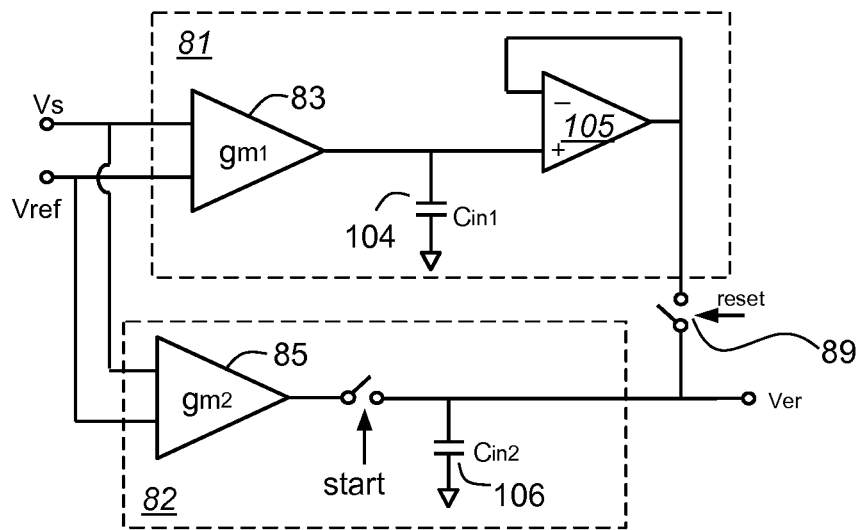
FIG. 10 shows a partly schematic diagram of an error amplifier according to this embodiment of the invention.

FIG. 10 shows a partly schematic diagram of an error amplifier according to this embodiment of the invention, in which it is shown that the first integrator 84 may be implemented by means of a capacitor Cin1 at 104, together with a voltage buffer comprising an operational amplifier 105 with local negative feedback, whereas the second integrator 86 may be implemented by means of a second capacitor Cin2 at 106. The first integrator 84 comprises a buffer but the second integrator 86 doesn't comprise a buffer, since the output of the first integrator 84 should be transferred to the output of the second integrator 86 directly by switch 89 during the pulse "reset".

Figure 11:
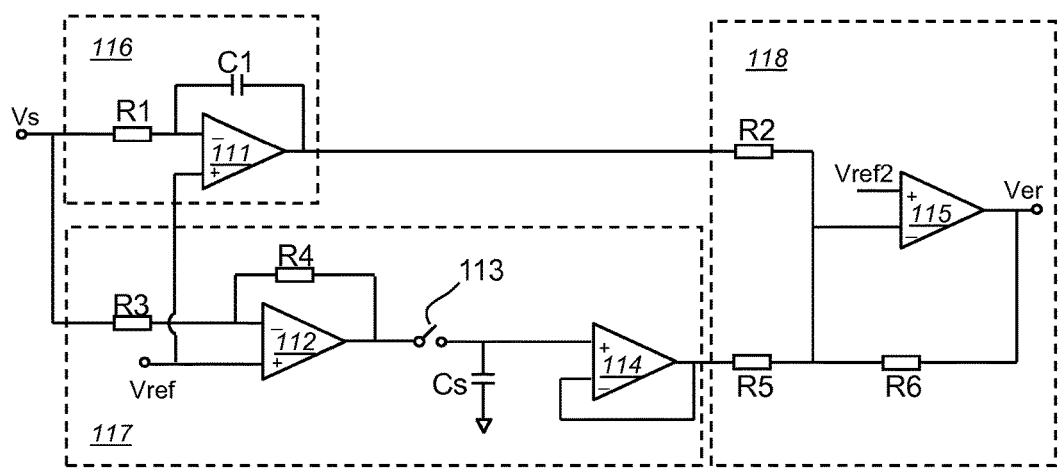
FIG. 11 shows a partly schematic diagram of an error amplifier according to a further embodiment of the invention.

FIG. 11 shows a block diagram of an error amplifier 110 according to further embodiment of the invention. In this embodiment the continuous time integration channel 116 comprises an operational amplifier 111 and capacitor C1, together with input scaling resistor R1 respectively, which amplify and integrate the difference between Vs and Vref. The lower path shown comprises a sampling and hold channel 117. This channel comprises a pre-amplifier which comprises an operational amplifier 112, input resistor R3 and local feedback resistor R4, which amplifies the difference between Vs and Vref. This amplified output is sampled on the sampling and hold capacitor Cs by means of the sampling switch 113, which is briefly closed for this purpose. The output is buffered by a buffer comprising operational amplifier 114 with local negative feedback. Such buffering is useful, in order to ensure that the sampling and hold capacitor Cs is not loaded.

As signal processing 118, the two channels are combined by means of scaling resistors R5 and R2, and the local feedback loop formed by opamp 115 and resistor R6. Due to the local feedback loop, the currents though R2 and R5 are well-defined by their own resistance and the corresponding channel's output voltage, and flow to R6 together to result in a weighted sum of the two error feedback channels.

From reading the present disclosure, other variations and modifications will be apparent to the skilled person. Such variations and modifications may involve equivalent and other features which are already known in the art of power factor controllers, and which may be used instead of, or in addition to, features already described herein.

In particular, it will be apparent that the disclosure is not limited to Boundary Conduction Mode PFC, but also holds for PFC circuits operating in Continuous Conduction Mode, and further to other topologies that enable PFC functionality, like flyback converters, SEPIC converters and the like.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A power factor controller comprising:
    an error feedback circuit configured to control an output of the power factor controller, wherein the error feedback circuit comprises:
    a first error feedback channel; and
    a second error feedback channel, wherein the first error feedback channel and the second feedback channel are configured to operate in parallel and each error feedback channel comprises a separate integrator, and
    wherein, the integrator in the second error feedback channel comprises a sample and hold circuit configured to periodically sample a difference between a signal indicative of the output of the power factor controller and a reference signal at a predetermined moment.

2. The power factor controller as claimed in claim 1, wherein the integrator in the first error feedback channel is configured to integrate the difference between the signal indicative of the output of the power factor controller and the reference signal.

3. The power factor controller as claimed in claim 1, wherein each integrator is configured to be a continuous-time integrator.

4. The power factor controller as claimed in claim 1, wherein the integrator in the second error feedback channel is configured to periodically integrate the difference between the signal indicative of the output of the power factor controller and the reference signal over a predetermined time interval.

5. The power factor controller as claimed in claim 4, configured for operation with a mains supply, wherein the periodic integration of each integrator has a periodicity associated with a half-cycle period of the mains supply.

6. The power factor controller of claim 5, wherein the periodic integration of each integrator has a periodicity substantially equal to the half-cycle period of the mains supply.

7. The power factor controller of claim 5, wherein the periodic integration of each integrator has a periodicity substantially equal to a multiple of the half-cycle period of the mains supply.

8. The power factor controller of claim 5, wherein the periodic integration of each integrator has a periodicity substantially equal to a fraction of the half-cycle period of the mains supply.

9. The power factor controller as claimed in claim 4, wherein the first error feedback channel is arranged to to provide a sample to the second error feedback channel to determine an initial value for the periodically integration of the difference.

10. The power factor controller as claimed in claim 1, configured for operation with a mains supply, wherein the periodically sample of the sample and hold circuit has a periodicity associated with a half-cycle period of the mains supply.

11. The power factor controller of claim 10, wherein an output of the error feedback circuit comprises a sum of an output of the first error feedback channel and an output of the second error feedback channel.

12. The power factor controller as claimed in claim 11, wherein the sum comprises a scaled version of the output of at least one of the first and second error feedback channels.

13. The power factor controller as claimed in claim 11, wherein the output of at least one of the first and second error feedback channels includes an offset signal for adjusting a range of the output of the at least one of the first and second error feedback channels.

14. A switched mode power converter comprising the power factor controller as claimed in claim 1.

15. The power factor controller of claim 1, further comprising:
    a switch configured to receive a start signal, wherein the switch is coupled to an input of the integrator in the second error feedback channel.

16. A method of providing an error feedback signal in a power factor controller operating in voltage control mode, the method comprising:
    providing, in a first channel, a first channel error feedback signal by continuously integrating a difference between a signal indicative of an output of the power factor control and a reference signal;
    providing, in the second channel, a second channel error feedback signal, wherein the first and second channels use separate integrators;
    periodically, in the second channel, in the second channel, sampling the difference between the signal indicative of the output of the power factor controller and the reference signal at a predetermined moment; and
    determining the error feedback signal from the first channel error feedback signal and the second channel error feedback signal.

17. The method of claim 16, wherein providing the second channel error feedback signal further comprises:
    periodically integrating a difference between a signal indicative of the output of the power factor controller and the reference signal over a predetermined time interval.

18. A power factor controller comprising:
    an error feedback circuit configured to control an output of the power factor controller, wherein the error feedback circuit comprises:
    a first error feedback channel;
    a second error feedback channel, wherein the first error feedback channel and the second error feedback channel are configured to operate in parallel and each error feedback channel comprises a separate integrator; and
    a switch configured to receive a reset signal, wherein the switch is coupled between an output of the integrator in the first error feedback channel and an output of the integrator in the second error feedback channel.

* * * * *